Dec. 22, 1953  F. H. S. ROSSIRE  2,663,519
ENGAGEMENT STATION FOR AUTOMATIC PILOTS
Filed Jan. 13, 1950                                   2 Sheets-Sheet 1

*INVENTOR.*
FRANCIS HENRY S. ROSSIRE
BY
*ATTORNEY*

INVENTOR.
FRANCIS HENRY S. ROSSIRE

Patented Dec. 22, 1953

2,663,519

UNITED STATES PATENT OFFICE 2,663,519

ENGAGEMENT STATION FOR AUTOMATIC PILOTS

Francis Henry S. Rossire, Leonia, N. J., assignor to Bendix Aviation Corporation, Teterboro, N. J., a corporation of Delaware Application January 13, 1950, Serial No. 138,423

10 Claims. (Cl. 244—77)

This invention generally relates to control apparatus and more particularly to an engagement station for an aircraft automatic pilot having various safety features for preventing operation of the control surfaces by the automatic pilot until certain prerequisites in the electrical network of the automatic pilot have been fulfilled.

While various arrangements have been proposed heretofore for engaging and disengaging an automatic pilot with aircraft control surfaces they have all possessed certain disadvantages which have been overcome by the novel engagement station of the present invention.

An object of the present invention, therefore, is to provide a novel engaging station for an aircraft automatic pilot.

Another object of the invention is to provide a novel aircraft automatic pilot engaging station which will turn over control of the aircraft to the automatic pilot only when certain desirable electrical prerequisites have been satisfied in the electrical network of the automatic pilot.

A further object is to provide a novel and simple aircraft automatic pilot engagement station which when operated to an engaged position from a disengaged position will be automatically held in the engaged position providing the automatic pilot is operating in a proper manner.

Another and further object of the invention is to provide a novel and simple aircraft automatic pilot engagement station which when operated to an engaging position requires no mechanical locking or holding means to maintain it in the engaged position.

The above and other objects and advantages of the present invention will appear more fully hereinafter from a consideration of the detailed description which follows, taken together with the accompanying drawings, wherein one embodiment of the invention is illustrated. It is to be expressly understood, however, that the drawings are for the purpose of illustration and description only, and are not designed as a definition of the limits of the invention.

Figure 1:
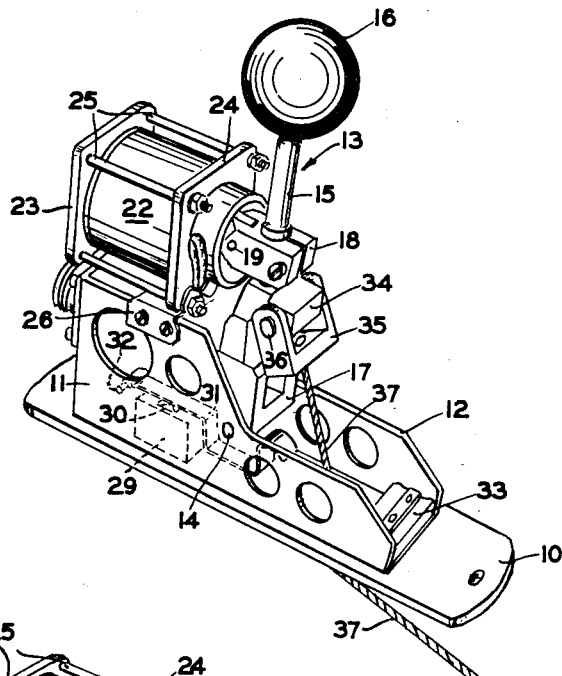
Figure 2:
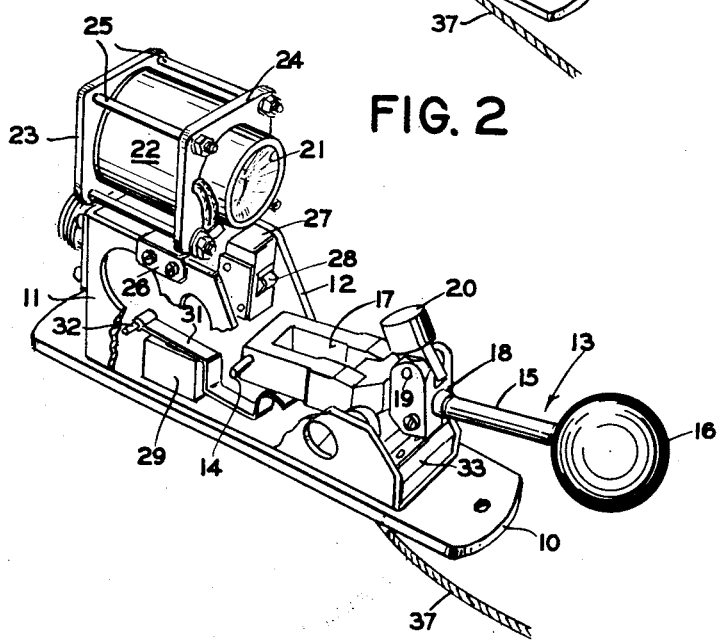
Figure 3:
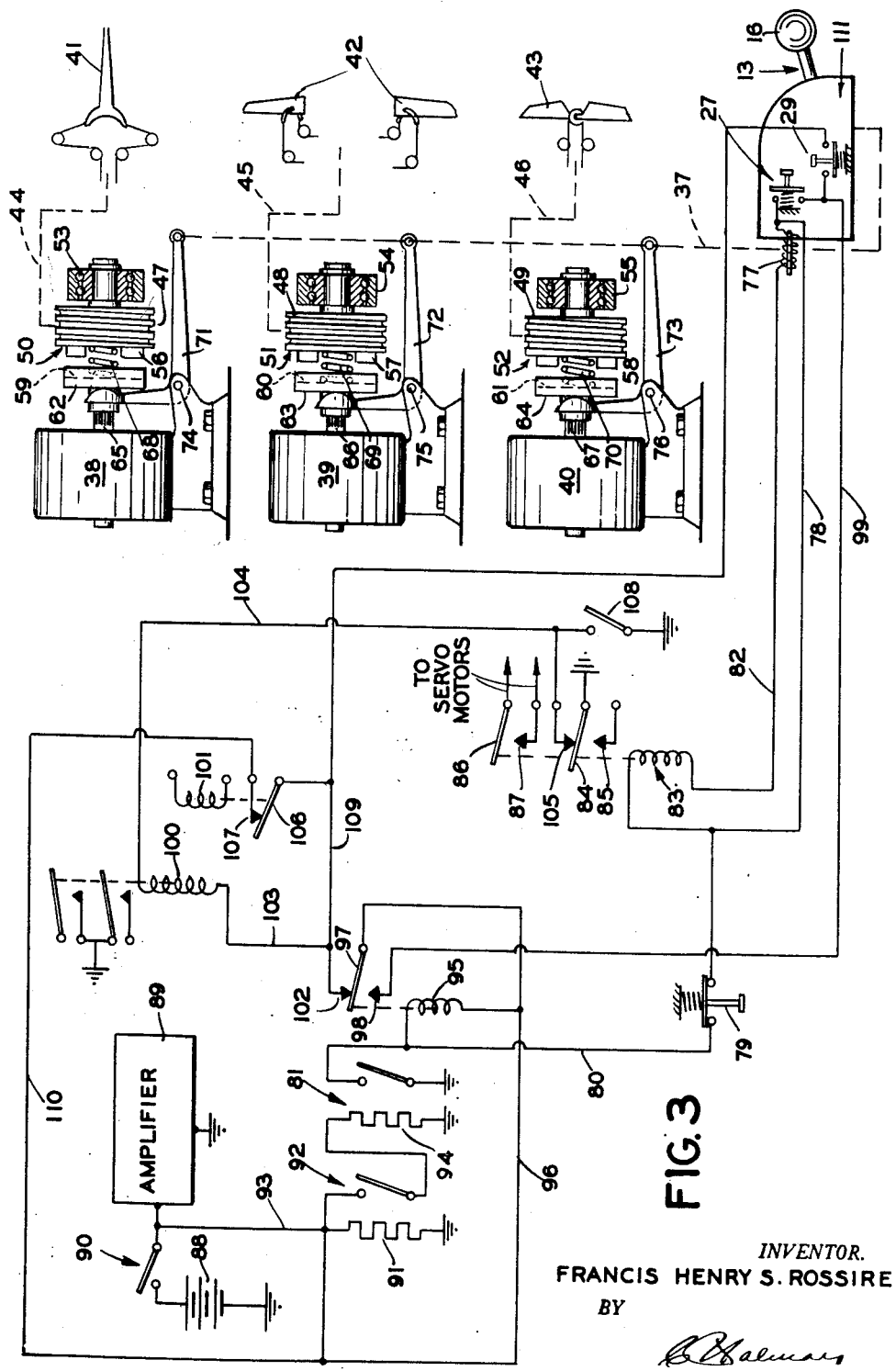

In the drawings wherein like reference characters refer to like parts throughout the several views, Figure 1 is a side elevation view in perspective of the novel engagement station of the present invention shown in its engaged position;

Figure 2 is a view similar to Figure 1 with the station in its disengaged position and with part of the frame broken away; and Figure 3 is a diagrammatic illustration of a steering system embodying the novel engagement station hereof.

Referring now to the drawings for a more detailed description of the present invention and more particularly to Figures 1 and 2 thereof, the novel engagement station hereof is there shown as comprising a base plate 10 having fastened thereto in a suitable manner a frame member in the form of two spaced parallel plates 11 and 12.

An actuating lever, generally designated with the reference character 13, is pivotally mounted on plates 11 and 12 by way of a pin 14. Lever 13 comprises a rod 15 provided with an actuating knob 16 at the outer end thereof and has fastened thereto at its opposite end a yoke member 17, the latter carrying the pin 14 for permitting up and down movement of the lever relative to the base plate. Rod 15, moreover, has a clamp 18 fastened thereto above yoke member 17 and is bifurcated for pivotally supporting thereon by way of a pin 19 a plunger 20.

Plunger 20, when lever 13 has been moved to its up or engaged position, registers with a hollow tapered guideway 21 which is a part of a solenoid housing 22, the solenoid thereof (not shown) being energized under certain conditions, to appear more fully hereinafter, to attract plunger 20 and thereby hold the actuating lever in its up or engaged position. Solenoid housing 22 is supported between retainer plates 23 and 24 which are fastened together by way of spacer bolts 25, the entire solenoid assembly being supported on frame plates 11 and 12 by means of a bracket 26.

A switch 27, adapted under certain conditions to energize the holding solenoid contained within housing 22, is mounted on frame plate 12 and has an actuating button 28 thereon which is engaged and depressed by a shoulder of yoke member 17 when the actuating lever has been moved to an up or engaged position. The switch is of conventional form and of a type which is closed when actuating button 28 has been depressed inwardly.

Supported on base plate 10, in a suitable manner, is a second switch 29 having an actuating button 30 therefor. This latter switch is also of conventional form and of a type which is closed when its button 30 has not been depressed inwardly. An irregular leaf spring 31 is provided for engaging and depressing button 30 to open switch 29, such spring being pivotally mounted at one of its ends by way of a pin 32 journalled within frame plate 11 and being engageable at its other end to depress button 30 by a second shoulder of yoke member 17 of the actuating lever.

It will be apparent that with lever 13 in the down or disengaged position shown in Figure 2, yoke 17 will press spring 31 downwardly to open switch 29. Inasmuch as lever 13 may return to a disengaged position rather rapidly, the interposition of spring 31 between the lever and switch 29 prevents injury to the switch. Moreover, in order to overcome any injury to the engagement station as a result of too rapid a return of the lever to its disengaged position, a rubber bumper 33 is provided on base plate 10 intermediate the ends of frame plates 11 and 12.

Fastened to or formed integrally with the rear of yoke member 17 is a block 34 which pivotally mounts a second yoke member 35 thereon by way of a pin 36. Yoke 35 is apertured to have suitably anchored therein one end of a cable 37 which passes through the base plate through a suitable opening (not shown) to a plurality of actuating levers in a manner to presently appear.

Cable 37 passes through the base plate at a point substantially intermediate the free end of spring 31 and bumper 33 so that in its engaged position a minimum amount of force is required to maintain the lever in its up position, such position being one slightly off vertical as observed in Figure 1. It will be apparent that in this latter position a substantial amount of the load on cable 37 will be impressed on pivot pin 14. For that reason the holding force of the solenoid contained within housing 22 is ample to maintain the lever in the desired engaged position. This novel and desirable result is obtained by utilizing what approaches an over center linkage system.

The novel engagement station hereof is shown in Figure 3 as applied to an aircraft automatic pilot having rudder, aileron and elevator servomotors 38, 39 and 40 for engaging the latter with or disengaging them from craft rudder, aileron and elevator surfaces 41, 42 and 43, respectively. Such surfaces are normally displaceable by way of cables 44, 45 and 46, respectively, which are wrapped about their related sheaves 47, 48 and 49. These latter may be operated either by the human pilot through a manual control column (not shown) or automatically by an automatic pilot in a well known manner.

Sheaves 47, 48 and 49 are carried by driven clutch parts 50, 51 and 52, respectively, which are rotatably journalled within suitable bearings 53, 54 and 55 and which, moreover, are provided with engaging surfaces 56, 57 and 58, adapted to drivably register with slots 59, 60 and 61 carried by driving clutch parts 62, 63 and 64. The latter parts are fastened to motor shafts 65, 66 and 67 which are mounted for longitudinal movement relative to their servomotors in a well known manner.

Driving clutch parts 62, 63 and 64 are movable into engagement with their related driven clutch parts against suitable springs 68, 69 and 70 to establish a driving connection between the rudder, aileron and elevator servomotors and their related control surfaces by way of bell crank levers 71, 72 and 73. These levers are pivotally mounted on the motor frames by way of pins 74, 75 and 76 and have bifurcated ends straddling shafts 65, 66 and 67 for engaging with the driving clutch parts 62, 63 and 64, the opposite ends of the levers being apertured for the reception of cable 37 therein.

By actuating lever 13 from a disengaged to an engaged position, cable 37 pulls bellcrank levers 71, 72 and 73 downwardly to pivot their bifurcated ends inwardly whereby the driving and driven clutch parts are brought into registry to thereby establish a drivable connection between the servomotors and their related control surfaces. When lever 13 is actuated to its disengaged position, on the other hand, springs 68, 69 and 70 will position driving clutch parts 62, 63 and 64 to the left, as shown in Figure 3, to thereby terminate the drivable connection between the servomotors and the control surfaces.

In accordance with one desirable feature of the present invention derived with the novel engagement station hereof, the latter when operated to an engaged position will not be held in that position unless certain desirable prerequisites have been satisfied in the electrical network of the automatic pilot. For example, the amplifier sections of the network must have been sufficiently heated prior to effecting engagement of the pilot, the spin axis of the controlling gyro horizons should have been brought into a desired vertical position, etc. To this end, therefore, the novel circuit of Figure 3 is provided in which solenoid winding 77 (located within solenoid housing 22) will be energized to hold lever 13 in the engaged position when it has been moved to such position, the holding force being exerted by the core (not shown) of the solenoid on plunger 20.

One end of solenoid winding 77 connects with one terminal of switch 27 and by way of a conductor 78, a normally closed pilot's disengage switch 79, and a lead 80 with one terminal of a thermal delay switch 81. The opposite end of winding 77 connects by way of a lead 82 with one end of a coil of a relay 83, the opposite end of which likewise connects with disengage switch 79. When relay 83 is energized, it moves a grounded armature 84 into engagement with a fixed contact 85 and also moves an armature 86 into engagement with a fixed contact 87, engagement between the latter determining energization of the fixed phases of servomotors 38, 39 and 40 which constitute two phase induction motors.

A battery 88, having one side grounded as shown, is utilized to heat the various filaments of a conventional amplifier 89 and to energize the various relays in the circuit. Amplifier 89 has three channels as shown and described more clearly in copending application Serial No. 516,488, filed December 31, 1943, each channel receiving a reference signal at its input and at its output energizing the variable phase of its related servomotor in the well known manner.

On closing of a power switch 90 the battery heats the various filaments of the amplifier but the automatic pilot cannot be engaged with the various control surfaces until sufficient time has elapsed for proper functioning of the amplifier. On closure of switch 90 the battery also heats a resistor 91 of a normally open thermal time delay switch 92 by way of a lead 93, the switch closing after a predetermined interval of time to heat a resistor 94 of the second thermal delay switch 81. Again, after a lapse of a predetermined interval of time, switch 81 will close to establish a ground connection for the remainder of the circuit as will presently appear. The time constants of the thermal switches are so selected that when switch 81 is closed, amplifier 89 will have been sufficiently heated to permit engagement of the automatic pilot with the control surfaces.

Upon closing of thermal switch 81 the coil of a relay 95 is connected to ground by way of a lead 80 and to battery 88 by way of a lead 96 and lead 93. Energization of relay 95, as will now be apparent, moves an armature 97 into engagement with a fixed contact 98 to establish an operative connection for relay 83 and solenoid winding 77 to the battery. The various components of the control circuit and the automatic pilot are now in proper condition for an operative engagement operation.

By moving actuating lever 13 to its up or engaged position switch 27 is closed by the lever resulting in an energization of solenoid winding 77 to hold the lever in its engaged position and thereby maintain switch 27 closed. Closure of switch 27, as will now appear, connects one side of winding 77 with the battery by way of a lead 99, fixed contact 98 and movable armature 97 of relay 95 and leads 93 and 96, the opposite end of the winding being grounded by way of switch 79, lead 80 and the grounded terminal of thermal switch 81. By virtue of the same circuit relay 83 is likewise energized to move grounded armature 84 into engagement with fixed contact 85 and armature 86 into engagement with fixed contact 87, the latter armature and contact establishing energization of the fixed phases of the servomotors.

Lever 13 will remain in its engaged position by virtue of holding solenoid 77 and the craft surfaces will be under control of the automatic pilot. To disengage the automatic pilot from the craft control surfaces whereby the human pilot may take over manual control of the latter, he need merely momentarily open disengage switch 79 which de-energizes solenoid winding 77 and permits lever 13 to drop to its disengaged position, opening both switches 27 and 29. Instead of using the disengage switch, the human pilot may also disengage the servomotors from the control surfaces by simply grasping lever 13 and overpowering the magnetic holding force between the holding solenoid and the lever plunger.

In addition to the foregoing, the novel engagement station hereof also controls an erection relay having a coil 100 for maintaining one or more gyro horizons in a substantially vertical position during level flight. During a turn or change of course it is desirable to have the gyros act as free gyros and for that reason a second control or monitoring relay having a coil 101 is provided. In the disengaged position of lever 13, switch 29 is open and initially relay coil 100 is energized from the battery by way of leads 93, 96, armature 97 and a fixed contact 102 of relay 95, and lead 103, the opposite end of the coil being grounded by way of a lead 104, a fixed contact 105 and armature 84 of relay 83. After thermal switches 92 and 81 have closed, and prior to an engaging operation, armature 97 will engage with contact 98 of relay 95 to open the direct connection to the battery.

Relay 101, however, will be de-energized only during a turn so that during level flight it will be energized and thereby maintain its armature 106 in engagement with fixed contact 107. Even though, therefore, the connection of relay 100 to the battery through relay 95 has been broken another connection is provided therefor by way of lead 93, a lead 110, fixed contact 107 and movable armature 106 of relay 101 and a lead 109.

On displacement of lever 13 from a disengaged to an engaged position, switch 29 is closed and switch 27 is closed. Closing of switch 27 energizes relay 83 whereby armature 84 leaves fixed contact 105 to break the ground connection for relay 100 but with the turn controller of the automatic pilot centered a switch 108 will be closed to establish a new ground for relay coil 100. Closing of switch 29, on the other hand, connects the battery to one side of coil 100, to maintain the latter energized in the event monitoring relay 101 is de-energized, by way of leads 93, 96, armature 97 and fixed contact 98 of relay 95, lead 99, switch 29 and lead 109.

There has thus been provided a novel engagement station for an automatic pilot system for drivably connecting the latter to the craft control surfaces which when operated to an engaged position will be maintained in such position automatically without the requirement of mechanical locking expedients as heretofore. It will be apparent that the novel device of Figures 1 and 2 will be provided with an outer housing 111, generally of the configuration shown in Figure 3, the top portion thereof being slotted to permit up and down motion of the actuating lever.

Although but a single embodiment of the present invention has been illustrated and described in detail, it is to be expressly understood that the invention is not limited thereto. Various changes can be made in the design and arrangement of parts without departing from the spirit and scope of the invention.

I claim:

1. In combination, an automatic steering system for operating a craft control surface, means operatively associated with said system for bringing said system from an ineffective to an effective condition, clutch means operatively associated with said system and surface and having an engaged position for connecting said system with said surface and having a dis-engaged position for disconnecting said system from said surface, an engagement station for operating said clutch means and comprising a movable member operatively connected to said clutch means and having an engaged position and a dis-engaged position, said member being operable in its engaged position to operate said clutch means for connecting said system with said surface and in its disengaged position for disconnecting said system from said surface, control means engageable with and operated by movement of said member to its engaged position, holding means engageable with said member and actuated by said control means upon movement of said member to the engaged position thereof for maintaining said member in its engaged position, and means connected to said system and control means for making said control means ineffective to actuate said holding means until said system has been brought to an effective condition.

2. In combination, an automatic steering system for operating a craft control surface, means operatively associated with said system for bringing said system from an ineffective to an effective condition, clutch means operatively associated with said system and surface and having an engaged position for connecting said system with said surface and having a dis-engaged position for disconnecting said system from said surface, an engagement station for operating said clutch means and comprising a movable lever operatively connected with said clutch means and having a clutch engaging position and a clutch disengaging position, control means engageable with and operated by movement of said lever to its clutch engaging position, holding means actuated by said control means for maintaining said lever in its clutch engaging position, means operatively connected with said control means and system and operative when said system has been brought to an effective condition to make said control means effective on said holding means to thereby maintain said member in the clutch engaging position thereof, and switch means operatively connected to said holding means and control means for making said control means ineffective on said holding means whereby said lever is released to its clutch dis-engaging position.

3. In combination, an automatic steering system for operating a craft control surface, means operatively associated with said system for bringing said system from an ineffective to an effective condition, clutch means operatively associated with said system and surface and having an engaged position for connecting said system with said surface and having a dis-engaged position for disconnecting said system from said surface, an engagement station for operating said clutch means and comprising a movable lever operatively connected with said clutch means and having an engaged position in which said clutch means is operated to its engaged position and a dis-engaged position in which said clutch means is operated to its dis-engaged position, first switch means engageable with and operated by movement of said lever to its engaged position, electrical holding means engageable with said lever and energized by said first switch means for maintaining said lever in its engaged position, means operatively connected with said first switch means and with said system and operative when said system has been brought to an effective condition to make said first switch means effective on said holding means to maintain said lever in the engaged position thereof, second switch means connected with said holding means and with said means connecting said first switch means with said system for de-energizing said holding means whereby said lever is released to its dis-engaged position, and third switch means operated by said lever in its dis-engaged position.

4. In combination, an automatic steering system for operating a craft control surface, means operatively associated with said system for bringing said system from an ineffective to an effective condition, clutch means operatively associated with said system and surface and having an engaged position for connecting said system with said surface and having a dis-engaged position for disconnecting said system from said surface, an engagement station for operating said clutch means and comprising a frame, a pivotally mounted lever supported on said frame and operatively connected with said clutch means, said lever having an engaged position in which said clutch means is operated to its engaged position and a dis-engaged position in which said clutch means is operated to its dis-engaged position, a guideway supported on the frame, a solenoid associated with the guideway, switch means supported by the frame and actuated by the lever when the latter has been moved to an engaged position to energize said solenoid, a plunger mounted on said lever and registering with said guideway whereby said solenoid maintains said lever in said engaged position, and means operatively connected with said switch means and with said system for making said switch means effective on said solenoid only when said system has been brought to an effective condition.

5. In combination, an automatic steering system for operating a craft control surface, means operatively associated with said system for bringing said system from an ineffective to an effective condition, clutch means operatively associated with said system and surface and having an engaged position for connecting said system with said surface and having a dis-engaged position for disconnecting said system from said surface, an engagement station for operating said clutch means and comprising a frame, a pivotally mounted lever supported on said frame and operatively connected with said clutch means, said lever having an engaged position in which said clutch means is operated to its engaged position and a dis-engaged position in which said clutch means is operated to its dis-engaged position, a hollow tapered guideway supported on the frame, a solenoid associated with the guideway, switch means supported by the frame and engageable with and actuated by the lever when the latter has been moved to an engaged position to energize said solenoid, a plunger pivotally mounted on said lever and registering with said guideway whereby said solenoid maintains said lever in said engaged position when said switch means is actuated to energize said solenoid, and means operatively connected with said switch means and with said system for making said switch means effective on said solenoid to energize the same only when said system has been brought to an effective condition.

6. In combination, an automatic steering system for operating a craft control surface, means operatively associated with said system for bringing said system from an ineffective to an effective condition, clutch means operatively associated with said system and surface and having an engaged position for connecting said system with said surface and having a dis-engaged position for disconnecting said system from said surface, an engagement station for operating said clutch means and comprising a frame, a pivotally mounted lever supported on said frame and having a cable connection to said clutch means, said lever having an engaged position in which said clutch means is operated to its engaged position and a dis-engaged position in which said clutch means is operated to its dis-engaged position, a switch actuated solenoid supported by said frame, said lever when moved to an engaged position engaging and actuating said switch to operate said solenoid whereby the latter holds the lever in the engaged position, the lever mounting and cable connection on the frame including an over center linkage system whereby in the dis-engaged position of said lever substantially the full load exerted on the cable by the clutch means is applied to the lever while in the engaged position of said lever a relatively small portion of the load is applied to the lever whereby a relatively small holding force is required on the part of the solenoid for maintaining the lever in the engaged position for a relatively large load accommodated by the cable, and means operatively connected with said switch and with said system for making said switch effective to operate said solenoid only when said system has been brought to an effective condition.

7. In combination, an aircraft automatic pilot for operating craft rudder, aileron and elevator surfaces, means operatively associated with said system for bringing said automatic pilot from an ineffective to an effective condition, clutch means operatively associated with said system and each of said surfaces having an engaged position for connecting said automatic pilot with said rudder, aileron and elevator surfaces and having a dis-engaged position for disconnecting said automatic pilot from said rudder, aileron and elevator surfaces, an engagement station for operating said clutch means and comprising a movable lever operatively connected to said clutch means and having an engaged position in which said clutch means is operated to its engaged position and a dis-engaged position in which said clutch means is operated to its dis-engaged position, switch means engageable with and operated by movement of said lever to its engaged position, holding means operatively connected to and actuated by said switch means for maintaining said lever in its engaged position, and means operatively connecting said automatic pilot with said switch means and operative to make said switch means ineffective to actuate said holding means until said automatic pilot has been brought to an effective condition.

8. In combination, an automatic steering system for operating a craft control surface, means operatively associated with said system for bringing said system from an ineffective to an effective condition, clutch means operatively associated with said system and surfaces and having an engaged position for connecting said system with said surface and having a dis-engaged position for disconnecting said system from said surface, an engagement station for operating said clutch means and comprising a frame, an actuating lever movably mounted on the frame and operatively connected with said clutch means, said lever having a clutch engaging position and a clutch dis-engaging position whereby said system is connected with or disconnected from said surface, a switch supported on the frame and engageable with and actuated by the lever in its clutch engaging position, electrical holding means energized by said switch upon the actuation thereof by said lever for maintaining said lever in the clutch engaging position, first means carried by said holding means, second means carried by said lever and registering with said first means for mutual cooperation therewith when said lever is in its clutch engaging position, and means operatively connected with said switch and with said system for making said switch effective on said holding means to energize the same only when said system has been brought to an effective condition.

9. In combination, an automatic steering system for operating a craft control surface, means operatively associated with said system for bringing said system from an ineffective to an effective condition, clutch means having an engaged position operatively associated with said system and surface and for connecting said system with said surface and having a dis-engaged position for disconnecting said system from said surface, an actuating device for operating said clutch means and comprising a frame, a pair of spaced control switches on said frame, a lever pivotally mounted on said frame and operatively connected with said clutch means, said lever having a clutch engaging position in which it actuates one of said switches and a clutch dis-engaging position in which it actuates the other of said switches, a solenoid energized in response to actuation of said one switch for generating a holding force on said lever to maintain said lever in its clutch engaging position, and means operatively connected with said system and with said one switch for making the latter ineffective on said solenoid until said system has been brought to an effective condition.

10. The combination with an automatic steering system for operating a craft control surface, said system including means for bringing said system from an ineffective to an effective condition and clutch means having an engaged position for connecting said system with said surface and having a disengaged position for disconnecting said system from said surface, of an engagement station for operating said clutch means, said station comprising a movable member operatively connected to said clutch means and having an engaged position and a disengaged position, said member in its engaged position operating said clutch means to connect said system with said surface and in its disengaged position operating said clutch means to disconnect said system from said surface, holding means engageable with said member in its engaged position and when actuated maintaining said member in its engaged position, control means engageable with and operated by said member in its engaged position to actuate said holding means, and time-delay means operatively connected with said system and control means whereby the latter is rendered ineffective to actuate said holding means until a predetermined time after the operation of said first mentioned means.

FRANCIS HENRY S. ROSSIRE.

References Cited in the file of this patent

UNITED STATES PATENTS

| Number | Name | Date |
| --- | --- | --- |
| 559,240 | Weller | Apr. 28, 1896 |
| 1,839,629 | Williams | Jan. 5, 1932 |
| 1,908,786 | Pioch | May 16, 1933 |
| 2,121,798 | Howe | June 28, 1938 |
| 2,466,702 | Hamby | Apr. 12, 1949 |
| 2,469,609 | Ray | May 10, 1949 |